3,078,316
PRODUCTION OF MENTHOL
Robert R. Bottoms, Crestwood, Ky., assignor to Chemetron Corporation, Chicago, Ill., a corporation of Delaware
No Drawing. Filed Dec. 28, 1959, Ser. No. 862,064
5 Claims. (Cl. 260—631)

This invention relates to a method of making menthol. More particularly, this invention relates to a method of producing menthol from menthene. More specifically the invention relates to a method of producing a menthol by subjecting menthene to oxidation with an organic peracid, heating the oxidation products in the presence of an acid to produce menthone and hydrogenating said menthone to menthol.

Menthol is a commercially important natural product found in peppermint oil and is also widely used in perfumery, flavoring and confectionery as well as in medicine. Racemic menthol produced by synthetic methods can be resolved by known procedures to produce 1-menthol which is identical to the natural menthol. Greatly increased demand for menthol in cigarettes, medicines and candies has led to an intensification of research and development on procedures for producing racemic and optically active menthol from readily available source materials.

Menthenes, such as 3-p-menthene, and 2-p-menthene, can be readily produced from p-menthadienes by hydrogenation with a nickel catalyst and hydrogen at relatively low pressures and temperatures. In this way a mixture of menthenes consisting essentially of 3-p-menthene is produced economically from readily available materials. The conversion of menthene to menthol via menthone by efficient and economic methods has long been a goal in terpene chemistry.

It is an object of this invention to provide a method for synthesizing menthol from menthene. It is another object to synthesize and produce menthol by a simple method in high yield from readily available starting materials. It is a further object of this invention to provide a relatively simple and economically feasible method for the large-scale commercial manufacture of menthol. These and other objects of this invention will be apparent from and are achieved in accordance with the following disclosure.

In the present invention it has been discovered that relatively inexpensive and readily available organic peracids are effective oxidizing agents under specified conditions which produce a minimum of impurities and result in a high yield of menthone which can then be hydrogenated or otherwise reduced to menthol. Broadly the present invention comprises the steps of treating menthene (such as 3-p-menthene) with an organic peracid derived from a lower alkanoic acid containing 1 to 5 carbon atoms (such as performic or peracetic acid) to produce an ester of 3,4-menthene-glycol, heating the latter under acid conditions at a pH between 0.5 to 1.3 to produce menthone and hydrogenating the latter to menthol.

The starting material, 3-p-menthene, may be produced from any suitable source of mixed p-menthadienes. One source of such p-menthadienes is the material obtained by isomerization of pinene using sulfuric acid as the isomerization catalyst. For example, turpentine when agitated with dilute sulfuric acid at low temperature produces a mixture of monocyclic terpene hydrocarbons which are largely alpha-terpinene, gamma-terpinene and iso-terpinolene. All of these materials can be converted into 3-p-menthene by hydrogenation with a hydrogenation catalyst such as Raney nickel at temperatures below 120° C. and at pressures in the range of 100–500 p.s.i.g. At the conclusion of the hydrogenation step the hydrocarbon is separated from the catalyst and fractionally distilled to produce 3-p-menthene.

In the first step of this invention 3-p-menthene is subjected to oxidation to form various oxidation products by means of an organic peracid, such as performic or peracetic acid. The oxidation is effected under atmospheric pressure in a vessel fitted with a suitable mechanical agitator and means for heating or cooling the vessel. The organic peracids, such as peracetic or performic acid, are preferably produced in situ from hydrogen peroxide and acetic acid or formic acid. Formic acid is preferred because it has been found to give somewhat higher yields than other acids and the ester of the 3,4-menthene glycol which is initially formed in the reaction readily undergoes hydrolysis to produce free menthene glycol. It is preferred to carry out the oxidation step in the presence of an acid catalyst such as sulfuric acid. Other acids which are suitable as catalysts include phosphoric acid, hydrochloric acid, hydrobromic acid, oxallic acid and organic hydrocarbon sulfonic acids containing 1 to 7 carbon atoms selected from the group consisting of aromatic hydrocarbon sulfonic acids and alkane sulfonic acids such as benzenesulfonic acid, toluenesulfonic acid and lower alkane-sulfonic acids such as methanesulfonic, ethanesulfonic, and propanesulfonic acids. The acid catalyst may be employed in anhydrous or in aqueous solution in widely varying amounts and concentration. For example, it has been found that sulfuric acid varying in concentration from 1% to as much as 30% by weight of p-menthene-3- used, and in concentration from 5% to 80% acid, is suitable. Preferably 5% to 10% of sulfuric acid based on the weight of p-menthene-3 in the form of about 50% aqueous solution is employed. The amount of alkanoic acid used in the oxidation step may vary from about one mole per mole of p-menthene-3 to about 5 moles per mole of p-menthene-3. It is possible to carry out the reaction at high temperature with less than the stoichiometric quantity of lower alkanoic acid. The hydrogen peroxide may be used in any of the usual commercial strengths from about 30% to about 90% concentration in aqueous solution. One mole of hydrogen peroxide is used for each mole of menthene to be oxidized; excesses of hydrogen peroxide are not detrimental but they are not desirable from the point of view of economy.

The oxidation step is generally carried out as follows: The 3-p-menthene and a molar excess of formic acid (or acetic acid) are introduced into the reaction vessel. The hydrogen peroxide is added to this mixture at a rate such that it is continuously consumed by the reaction as fast as it is introduced. This practice prevents the formation of substantial amounts of organic peracid and greatly adds to the safety of the operation. The reaction mixture is maintained at a temperature between 0° and 70° C. and most advantageously between 35° and 45° C. No excess over the stoichiometric quantity of hydrogen peroxide based upon the p-menthene content of the system is required. It is advantageous however to use an excess of formic or acetic acid in order to hasten the oxidation reaction and to more efficiently use the hydrogen peroxide, thus improving the yield of desired products. The oxidation products consist essentially of menthene glycol, menthene oxide, and mono-and di-esters of menthene glycol, with the organic acid selected. The esters of menthene glycol can be converted to menthene glycol by transesterification with a lower alcohol such as methanol or ethanol and an acid catalyst such as sulfuric acid or alkanesulfonic acid, by heating the oxidation products with an excess of alcohol and an acid at a temperature of 60–90° C.

As a second step of the operation, the oxidation mass is mixed with a strong acid, such as an organic hydrocarbon sulfonic acid containing 1 to 7 carbon atoms selected from the group consisting of aromatic hydrocarbon sulfonic acids and alkanesulfonic acids, or a mineral acid, to reduce the pH to a value in the range of 0.5 to 1.3 and the mixture is heated to 80° to 165° C. This leads to the conversion of the oxidation products of p-menthene-3 into menthone by hydrolysis, dehydration and/or isomerization. The crude menthone product produced therein is conveniently separated by distillation and is ready for further synthesis.

The preferred method of treating the oxidation products of 3-p-menthene includes the step of separating by decantation the oil phase from the organic acid phase. The oil containing the menthene oxidation products is then washed with water and with dilute alkali to neutralize any remaining free acid and to saponify any esters of menthene glycol. There is thus produced a mixture of menthene glycol and menthene oxide. The neutralized oil phase containing menthene glycol and menthene oxide is then placed in a still containing sufficient acid to render the mixture acidic with a pH in the range of 0.5 to 1.3. Acids such as sulfuric, toluenesulfonic, benzenesulfonic, alkanesulfonic (a commercial mixture of methanesulfonic, ethanesulfonic and a small amount of propanesulfonic), phosphoric and the like can be used. The mixture can then be distilled under reduced pressure and the crude menthone which is formed is separated by distillation, preferably under reduced pressure.

The third step of the synthesis involves the reduction of the menthone to menthol. Crude menthone obtained as above may be further purified by fractional distillation and then subjected to hydrogenation with various hydrogenation catalysts such as Raney nickel and copper chromite or a noble metal catalyst, such as palladium black or platinum oxide may be employed. The conditions under which the hydrogenation of menthone to menthone can be conducted can be varied widely and it is economical to use a low pressure, such as 400 p.s.i.g. at a temperature not exceeding 170° C. It has been found that with hydrogenation temperatures of 200–250° C. the undesirable geometrical isomers of dl-menthol are largely isomerized to dl-menthol, giving an improved yield of crystalline dl-menthol. There is no upper pressure limit other than that dictated by economics and the temperature may be varied between 140° and 350° C. With a more active catalyst such as palladium, these temperatures can be reduced to below 100° C. At the end of the hydrogenation step the reaction mass is filtered to remove catalyst and the filtrate of menthol is fractionally distilled.

The invention is further disclosed by the following examples which illustrate specific embodiments of the invention. It will be appreciated by those skilled in the art that numerous modifications in conditions, equivalent materials and the like may be made without departing from the invention.

*Example 1*

To 553 grams (4 moles) of 3-p-menthene and 736.5 grams (16 moles) of formic acid (88%) containing 7 grams of alkanesulfonic acid (a mixture of methanesulfonic and ethanesulfonic acids) in a reaction vessel equipped with a mechanical stirrer were added 500 grams (4.4 moles) of 30% aqueous hydrogen peroxide. The hydrogen peroxide was added slowly at a rate such that the temperature did not exceed 45° to 50° C. when the vessel was cooled with an ice water bath. The temperature was not allowed to fall below 45° C. in order to prevent accumulation of hydrogen peroxide which might react violently if the temperature again were increased to 45° C. After the hydrogen peroxide had been added the mixture was stirred at 45° C. for 3 hours. The menthene oxidation product (mainly 4-hydroxy-3-formoxymenthane or the 3-formyl ester of p-menthene glycol) was separated from the excess formic acid and the latter was brought to approximately ¾ neutrality by the addition of ammonium carbonate and ammonia water. Further oil separated and this was added to the menthene oxidation product described above. The combined menthene oxidation products were washed with water, with hot sodium carbonate solution and finally with water. The oxidation product was mixed with 100 cc. of ethanol and a saturated solution of alcoholic potassium hydroxide was added slowly while the mixture was warmed to 85–90° C. About 2½ moles (140 grams) of potassium hydroxide in the form of its alcoholic solution were required to neutralize the reaction mixture. The mixture was then heated to 90° C. for about 1 hour, some of the alcohol being distilled off. The aqueous alcohol layer containing inorganic salts was separated and discarded. The organic layer was placed in reflux apparatus with 50 ml. of mixed alkanesulfonic acids (a mixture of methane-, ethane- and propanesulfonic acids) and 50 ml. of ethanol and refluxed at 105° C. for 1 hour. The organic material was washed with water, with aqueous sodium carbonate solution and again with water. The menthone thus produced was fractionated under vacuum giving 300 grams of a crude menthone (50% yield) and 300 grams of residue which was largely menthene glycol.

*Example 2*

To 4 moles 3-p-menthene was added dropwise with stirring a solution of 4 moles of peracetic acid (50% concentration) in acetic acid, the temperature of the reaction mixture being kept at 25–30° C., by cooling with ice water. After the peracetic acid had been added the mixture was stirred for 30 minutes with 50 grams of mixed alkanesulfonic acids in 50 grams of acetic acid. After the acids had been added the temperature of the reaction mixture was increased slowly to 50° C. and held there for 2 hours. Then the mixture was added to 2 liters of water and the organic layer separated. The latter was washed with sodium carbonate solution and placed in a reflux apparatus with 50 ml. of alkanesulfonic acid and 50 ml. of alcohol and refluxed for 1 hour at 105° C. The product was washed with water, with sodium carbonate solution and finally with water. The menthone produced was dried and distilled under vacuum.

*Example 3*

To 4 moles (553 grams) of 3-p-menthene admixed with 800 grams of 88% formic acid and 8 grams of concentrated sulfuric acid maintained at 30° C. were added 4 moles (272 grams) of 50% aqueous hydrogen peroxide over a period of 2 hours. The mixture was stirred for another 30 minutes and then heated to 40° C. until the test for peroxide was negative (about 1–1½ hours). The formic acid solution was separated. The oil was separated, washed with sodium carbonate solution until the evolution of carbon dioxide ceased and then finally washed with water. The washed oil was placed in a 3-liter flask with 550 ml. of ethyl alcohol and 50 ml. of mixed alkanesulfonic acids, agitated and maintained at a temperature of 65–70° C. The reaction was spontaneous at first but soon slowed down. The water, ethyl formate and ethanol were distilled off through a Vigreux column until the pot temperature reached 110° C. and then the mixture was held at 110° C. for 1 hour. The residue was then washed with water, aqueous sodium carbonate solution and again with water. The organic material was dried and distilled, yielding 940 grams of menthone.

*Example 4*

1650 grams of dl-menthone containing 1% of Raney nickel catalyst were placed in an autoclave and heated to 135° C. in the presence of hydrogen under pressure of 700 p.s.i.g. The mixture was agitated and maintained at a temperature of 130° to 140° C. for about 1½ hours, during which time the drop in hydrogen pressure indicated the adsorption of approximately 1 mole of hydrogen per mole of menthone. The reaction mixture was cooled, settled, decanted from catalyst and fractionally distilled.

The following fractions were collected at 15 mm. pressure:

| Temperature, °C.: | Weight, grams |
|---|---|
| Up to 94 | 15 |
| 94–98 | 190 |
| 98–102 | 1285 |
| 102–104 | 100 |

The last two fractions totaling 1385 grams were substantially pure dl-menthol.

*Example 5*

Menthone was catalytically hydrogenated to menthol by the procedure of Example 4 but at a temperature of 200–220° C. for 1½ hours. Then the mixture was agitated at 200–220° C. for about 3 more hours to convert geometrical isomers of dl-menthol to dl-menthol. On fractional distillation of the product, a fraction collected at 104–106° C. (15 mm.) crystallized in the receiver, indicating that dl-menthol of high purity was produced.

What is claimed as new and is desired to be secured by Letters Patent of the United States is:

1. Method of producing dl-menthol from 3-p-menthene which consists of the steps of (*a*) subjecting 3-p-menthene to the oxidizing action of a stoichiometrically equivalent quantity of a peracid selected from the group consisting of performic and peracetic acids in an excess of alkanoic acid corresponding to said peracid, in the presence of an organic hydrocarbon sulfonic acid containing 1 to 7 carbon atoms selected from the group consisting of aromatic hydrocarbon sulfonic acids and alkanesulfonic acids at a temperature in the range of 25° to 50° C., (*b*) separating the resulting menthene glycol and esters thereof from the organic acids, (*c*) neutralizing the menthene glycol and esters thereof with alcoholic alkali, (*d*) converting the esters of menthene glycol to menthene glycol by transesterification with a lower alkanol in the presence of a lower alkanesulfonic acid at a temperature in the range of 60° to 105° C., (*e*) acidifying the resulting reaction mixture containing menthene glycol to a pH in the range of 0.5 to 1.3 with an organic hydrocarbon sulfonic acid containing 1 to 7 carbon atoms selected from the group consisting of aromatic hydrocarbon sulfonic acids and alkanesulfonic acids and heating said mixture to a temperature in the range of 80° to 165° C. to produce menthone, (*f*) hydrogenating said menthone to dl-menthol and geometrical isomers of dl-menthol by heating said menthone with an excess of hydrogen in the presence of a hydrogenation catalyst selected from the group consisting of nickel, copper chromite, platinum and palladium catalysts at a temperature in the range of 100° to 250° C. to produce a mixture of dl-menthol and geometrical isomers of dl-menthol, (*g*) and converting said geometrical isomers of dl-menthol to dl-menthol by heating them in the presence of said hydrogenation catalyst at a temperature in the range of 200° to 350° C.

2. The method of claim 1 wherein the peracid is peracetic acid.

3. The method of claim 1 wherein the peracid is performic acid.

4. The method of claim 1 wherein the organic hydrocarbon sulfonic acid is an alkanesulfonic acid containing 1 to 3 carbon atoms.

5. The method of claim 1 wherein the hydrogenation catalyst is Raney nickel.

References Cited in the file of this patent

UNITED STATES PATENTS

| 1,811,711 | Blagden | June 23, 1931 |
| 2,042,224 | Groll et al. | May 26, 1936 |
| 2,866,826 | McLaughlin et al. | Dec. 30, 1958 |

FOREIGN PATENTS

| 574,838 | Germany | Apr. 22, 1933 |